United States Patent
Hall et al.

(10) Patent No.: US 10,211,647 B2
(45) Date of Patent: Feb. 19, 2019

(54) ADAPTIVE POWER MANAGEMENT FOR SELF-SUSTAINING ENERGY HARVESTING SYSTEM

(71) Applicants: Stewart E. Hall, Wellington, FL (US); Melwyn F. Sequeira, Plantation, FL (US)

(72) Inventors: Stewart E. Hall, Wellington, FL (US); Melwyn F. Sequeira, Plantation, FL (US)

(73) Assignee: Sensomatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 15/951,561

(22) Filed: Apr. 12, 2018

(65) Prior Publication Data

US 2018/0241219 A1     Aug. 23, 2018

Related U.S. Application Data (63) Continuation of application No. 14/726,739, filed on Jun. 1, 2015, now Pat. No. 9,948,113, which is a
(Continued)

(51) Int. Cl.
*H02J 5/00* (2016.01)
*G08B 29/18* (2006.01)
(Continued)

(52) U.S. Cl.
CPC .............. *H02J 5/005* (2013.01); *G08B 17/00* (2013.01); *G08B 29/181* (2013.01); *H02J 1/10* (2013.01);
(Continued)

(58) Field of Classification Search
CPC .. H02J 5/005; H02J 1/10; H02J 7/0068; H02J 7/007; H02J 7/025; H02J 7/345; H02J 7/35; H02J 7/0054; G08B 17/08
(Continued)

(56) References Cited

U.S. PATENT DOCUMENTS

| 5,019,803 A | 5/1991 | Maram |
| 7,982,439 B2 | 7/2011 | Trainor et al. |

(Continued)

FOREIGN PATENT DOCUMENTS

| CN | 102624071 A | 8/2012 |
| FR | 2939248 A1 | 6/2010 |

(Continued)

OTHER PUBLICATIONS

U.S. Appl. No. 14/726,739, filed Jun. 1, 2015, Adaptive Power Management for Self-Sustaining Energy Harvesting System.
(Continued)

*Primary Examiner* — Dinh T Le
(74) *Attorney, Agent, or Firm* — Fox Rothschild LLP; Robert J. Sacco; Carol E. Thorstad-Forsyth (57) ABSTRACT

Systems (100) and methods (500, 600) for adaptively managing power for an Energy Harvesting System ("EHS"). The methods involve: measuring a light intensity level available in a surrounding environment; wirelessly communicating a first wireless signal from the EHS (100) to a remote device (700) for causing the light intensity level to be increased by remotely turning on a light source (106, 108) or opening a cover preventing light emitted from the light source from reaching the EHC, when the light intensity level is below a pre-specified level; using an Energy Harvesting Circuit ("EHC") to recharge a rechargeable battery (310) when the light intensity level rises above the pre-specified level; and wirelessly communicating a second wireless signal from the EHS to the remote device for causing the light source be turned off or the cover to be closed, when the capacity or state-of-charge of the rechargeable battery reaches a pre-specified value.

14 Claims, 9 Drawing Sheets

Related U.S. Application Data continuation of application No. 14/570,524, filed on Dec. 15, 2014, now Pat. No. 9,673,635.

(51) Int. Cl.
*H02J 7/00* (2006.01)
*H02J 7/34* (2006.01)
*H02J 7/35* (2006.01)
*H02J 7/02* (2016.01)
*H02J 1/10* (2006.01)
*G08B 17/00* (2006.01)

(52) U.S. Cl.
CPC ............ *H02J 7/007* (2013.01); *H02J 7/0068* (2013.01); *H02J 7/025* (2013.01); *H02J 7/345* (2013.01); *H02J 7/35* (2013.01); *H02J 7/0054* (2013.01)

(58) Field of Classification Search
USPC ........................................................ 307/104
See application file for complete search history.

(56) References Cited

U.S. PATENT DOCUMENTS

| | | | |
|---|---|---|---|
| 8,618,934 B2 | 12/2013 | Belov et al. | |
| 9,673,635 B2* | 6/2017 | Sequeira | H02J 5/005 |
| 9,806,527 B1* | 10/2017 | Olah | H02J 7/0055 |
| 9,948,113 B2* | 4/2018 | Hall | H02J 5/005 |
| 9,986,660 B2* | 5/2018 | Butscher | G01C 19/04 |
| 2004/0232878 A1 | 11/2004 | Couch et al. | |
| 2006/0172782 A1 | 8/2006 | Planning et al. | |
| 2010/0060231 A1 | 3/2010 | Trainor et al. | |
| 2011/0050756 A1 | 3/2011 | Cassidy et al. | |
| 2011/0199026 A1 | 8/2011 | Forrest et al. | |
| 2012/0068669 A1 | 3/2012 | Trainor et al. | |
| 2013/0265140 A1 | 10/2013 | Gudan et al. | |
| 2013/0336185 A1 | 12/2013 | Yang et al. | |
| 2014/0015470 A1* | 1/2014 | Lim | H02J 7/35 320/101 |
| 2014/0183947 A1 | 7/2014 | Chandler et al. | |
| 2015/0372536 A1 | 12/2015 | Naskali et al. | |
| 2016/0198818 A1 | 7/2016 | Akin et al. | |

FOREIGN PATENT DOCUMENTS

| | | |
|---|---|---|
| JP | 04010194 | 1/1992 |
| WO | 2005067121 A1 | 7/2005 |

OTHER PUBLICATIONS

U.S. Appl. No. 14/570,524, filed Dec. 15, 2014, Self Sustaining Energy Harvesting System.
Information about Related Patents and Patent Applications, see section 6 of the accompanying Information Disclosure Statement Letter, which concerns Related Patents and Patent Applications.
Glavin, M., et al., "A stand-alone photovoltaic supercapacitor battery hybrid energy storage system," 20008 13th IEEE Power Electronics and Motion Control Conference (Poznan, Poland, Sep. 1-3, 2008), IEEE, Piscataway, NJ, USA, Sep. 1, 2008, pp. 1688-1695, XP031343817, ISBN: 978-1-4244-1741-4.
PCT International Search Report and Written Opinion of the International Searching Authority for Intl. Appln. No. PCT/US2015/065737 dated Mar. 2, 2016.
PCT International Search Report and Written Opinion of the International Searching Authority (EPO) for International Application No. PCT/US2016/035279 (dated Aug. 8, 2016).

\* cited by examiner

ADAPTIVE POWER MANAGEMENT FOR SELF-SUSTAINING ENERGY HARVESTING SYSTEM

CROSS REFERENCE TO RELATED APPLICATIONS

This application is a continuation of U.S. patent application Ser. No. 14/570,524 (now U.S. Pat. No. 9,673,635) filed Dec. 15, 2014 and U.S. patent application Ser. No. 14/726,739 filed Jun. 1, 2015. The contents of which are incorporated herein by reference in its entirety.

FIELD OF THE INVENTION

This document relates generally to power management systems. More particularly, this disclosure relates to systems and methods for adaptive power management for self-sustaining energy harvesting systems.

BACKGROUND OF THE INVENTION

Wireless sensorization is replacing hard-wired fire protection sensing systems. Typically, protection sensing systems (e.g., smoke detectors) are hard-wired to the fire protection system's main fire panel. The main fire panel often resides at the front or in the basement of a building. The hard-wired fire protection sensing systems are deployed across the building's infrastructure and draw their power from the centralized power source (namely, the main fire panel). Relatively long wires are required to run throughout the building to facilitate the supply of power from the main fire panel to each of the hard-wired fire protection sensing systems. In effect, the systems have large installation costs resulting from the amount of labor and time required to install the same within the building.

Wireless sensorization is also being deployed using batteries to provide sensor and transceiver power. However, these batteries typically have to be replaced within one to two years. In some scenarios, thousands of sensors may be deployed within a single building. One can appreciate that it is quite expensive (in terms of labor, time and part costs) to replace the batteries every few years for each of these sensors.

These wireless sensing systems (e.g., fire systems and gas sensing systems) may be deployed in areas (e.g., vacation home and stairwells) where a primary energy harvesting source (e.g. lighting) may be turned off for relatively long periods of time (e.g., such as overnight, through a weekend, over holidays, or blocked by shades/blinds/clouds). Even in such environments where the energy harvesting source may be intermittent or turned off for extended periods of time, these wireless sensing systems must continue to operate and provide the safety and security to its environment.

SUMMARY OF THE INVENTION

The disclosure concerns implementing systems and methods for adaptively managing power for an Energy Harvesting System ("EHS"). The methods involve: measuring a light intensity level available in a surrounding environment of the EHS; wirelessly communicating a first wireless signal from the EHS to a remote device for causing the light intensity level to be increased by remotely turning on a light source or opening a cover (e.g., a window shade) preventing light emitted from the light source from reaching the EHC, when the light intensity level is below a pre-specified level; using an Energy Harvesting Circuit ("EHC") to recharge a rechargeable battery of the EHS when the light intensity level rises to a level above the pre-specified level; and wirelessly communicating a second wireless signal from the EHS to the remote device for causing the light source be turned off or the cover to be closed, when the capacity or State-Of-Charge ("SOC") of the rechargeable battery reaches a pre-specified value.

In some scenarios, the methods further involve: determining whether an available energy in the rechargeable battery is sufficient to meet energy requirements of an electrical load of the EHS; and supplying power to the electrical load if the available energy in the rechargeable battery is sufficient to meet energy requirements of the electrical load. Additionally or alternatively, the methods involve: determining if energy harvesting sources in the surrounding environment are operating properly in response to the first wireless signal; and curing any operational issues with the energy harvesting sources prior to using the EHC to recharge the rechargeable battery.

In those or other scenarios, the light intensity level is measured when: an available energy in the rechargeable battery is not sufficient to meet an electrical load's energy requirements; a current date matches a pre-stored date or a current time matches a pre-stored time; and/or there is a possibility of a storm or energy deficit in a next N hours, days, weeks or months. The pre-stored date and/or pre-stored time is(are) selected based on at least one of (a) power consumption patterns of the EHS, (b) power profiles of light sources; (c) estimated future energy deficits of the EHS system and/or the light sources, (d) a business entity's hours of operation, (e) current and future weather of the surrounding environment, and (f) times of low power demands on an AC power grid.

DESCRIPTION OF THE DRAWINGS

Embodiments will be described with reference to the following drawing figures, in which like numerals represent like items throughout the figures, and in which.

DETAILED DESCRIPTION OF THE INVENTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present disclosure contemplates the use of a self-sustaining EHS system. The EHS system effectively delivers power to and operates one or more loads thereof (e.g., smoke detectors), without having a requirement for the frequent replacement of the power source(s) thereof (as is the case in conventional sensing systems such as that discussed above in the Background Section of this document). In this regard, the EHS system generally collects and converts energy from a light source located within the surrounding environment (e.g., within a building). The converted energy is stored on a first storage element of the EHS system (e.g., a rechargeable battery). Thereafter, the first storage element supplies power to a second storage element (e.g., a super capacitor), which subsequently supplies power to a load (e.g., a sensor).

Notably, the EHS system of the present disclosure operates efficiently in indoor environments where the relatively small amount of available energy from light sources thereof is sufficient to charge the first storage element (e.g., as little as 100 mV at 10's of μAmps). In contrast, such available energy is not sufficient to operate conventional boost converter circuits of conventional sensor systems with satisfactory efficiency. As a result, the amount of time needed to initiate operations of these conventional sensor systems (e.g., 10's to 100's of hours) is significantly longer as compared to that of the present EHS system (e.g., near instantaneous).

Additionally, in some conventional EHS systems, the first storage element comprises a super capacitor. Such conventional EHS systems are inoperable in indoor environments since the relatively small amount of available energy from sources of the indoor environment is not sufficient to charge the super capacitor to a level needed for the EHS systems to operate. In contrast, the first storage element of the present EHS system comprises a rechargeable battery. Consequently, the present EHS system is operable in indoor environments since the rechargeable battery has an initial amount of charge (e.g., 3.3 V) sufficient to cause the EHS system to perform its intended functions nearly instantaneously after being powered on, as well as to quickly charge a super capacitor. The battery is recharged by the indoor sources while the load(s) (e.g., a smoke sensor) is(are) being supplied power from the second storage element (e.g., a super capacitor).

The present disclosure also concerns systems and methods for autonomously managing power to an EHS system. The autonomous management is achieved by on-demand commanding and activating energy harvesting sources available with the EHS system's environment. The methods generally involve: sensing harvestable energy present within an EHS system's environment; assessing the sensed harvestable energy; automatically enabling an energy harvesting source based upon results of the assessment so that the energy harvesting source may be utilized by the EHS system to dynamically charge its storage elements and power its sensing system; and automatically disabling the energy harvesting source after the charging is complete to either conserve power and/or extend the operating life of the energy harvesting source. The energy harvesting source includes, but not limited to, an indoor light or an outdoor light. In the outdoor light scenarios, the outdoor light is enabled by opening window shades and disabled by closing window shades.

Figure 1:
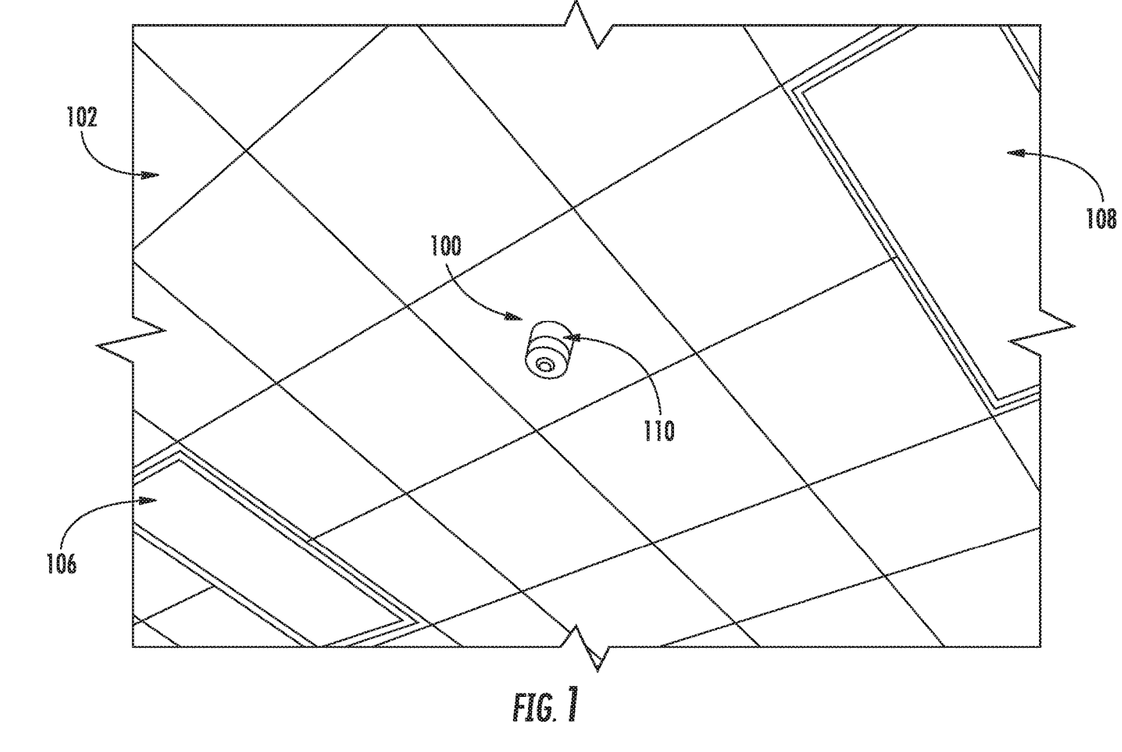
FIG. 1 is a schematic illustration showing an exemplary EHS system coupled to a ceiling of a building.

Referring now to FIG. 1, there is provided a schematic illustration of an exemplary EHS system 100 coupled to a ceiling 102 of a building's indoor room. The only source of energy in this indoor room is produced by the lateral dispersion of light from florescent lights 106, 108. As a result, a luminance of approximately fifty to one hundred lux is provided at the EHS system 100. Such a luminance is insufficient to power the load(s) of the EHS system 100. As such, the EHS system 100 comprises a Power Management Circuit ("PMC") (not shown in FIG. 1) for ensuring that power is made available to the load(s) nearly instantaneously after the system has been deployed in the indoor environment.

Figure 2:
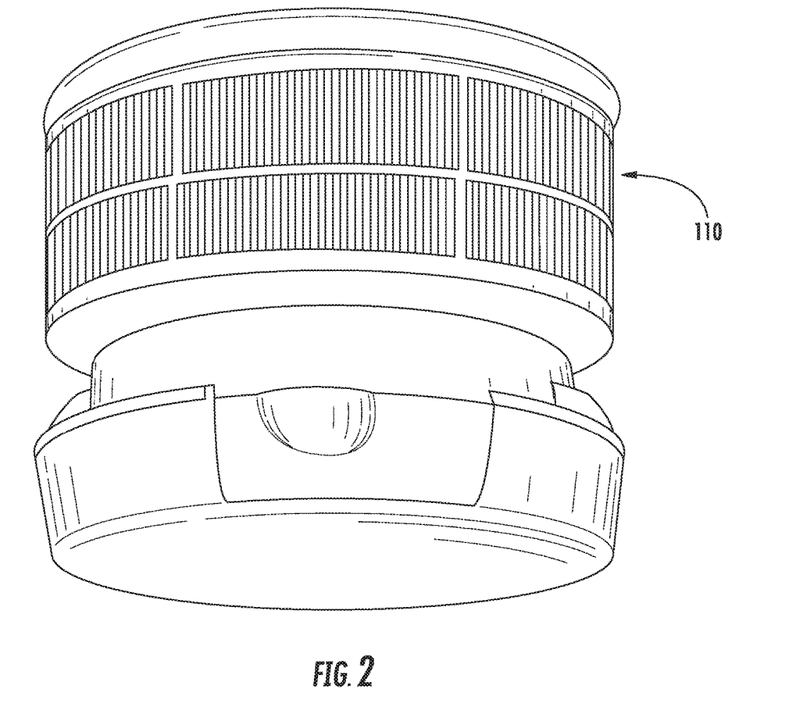
FIG. 2 is a schematic illustration of the EHS system of FIG. 1.

The PMC will be described in detail below in relation to FIG. 3. Still, it should be understood at this time that the PMC comprises photovoltaic cells 110 for converting florescent light energy into direct current electricity using semiconducting materials that exhibit the photovoltaic effect, as shown in FIGS. 1-2. When the photovoltaic cells 110 are exposed to the luminance of approximately fifty to one hundred lux, an extremely low energy power output is generated thereby. For example, in some scenarios, the direct current electrical output generated by the photovoltaic cells is five hundred milli-Volts at approximately three hundred micro-Amps, which results in a power output of one hundred fifty micro-Watts. Such a power level is not sufficient for charging a super capacitor based storage element in a satisfactory amount of time. As such, the present PMC employs a rechargeable battery (not shown in FIGS. 1-2) for storing a power output of the photovoltaic cells 110, instead of a super capacitor based storage element (as is done in some conventional sensor systems). A super capacitor based storage element (not shown in FIGS. 1-2) of the PMC is then charged by the output power of the rechargeable battery. In effect, the load(s) (not shown in FIGS. 1-2) of the present EHS system 100 is(are) supplied power nearly instantaneously after deployment of the system in the indoor environment. Additionally, the present EHS system 100 can operate fully autonomously and continuously available to perform its intended functions.

Figure 3:
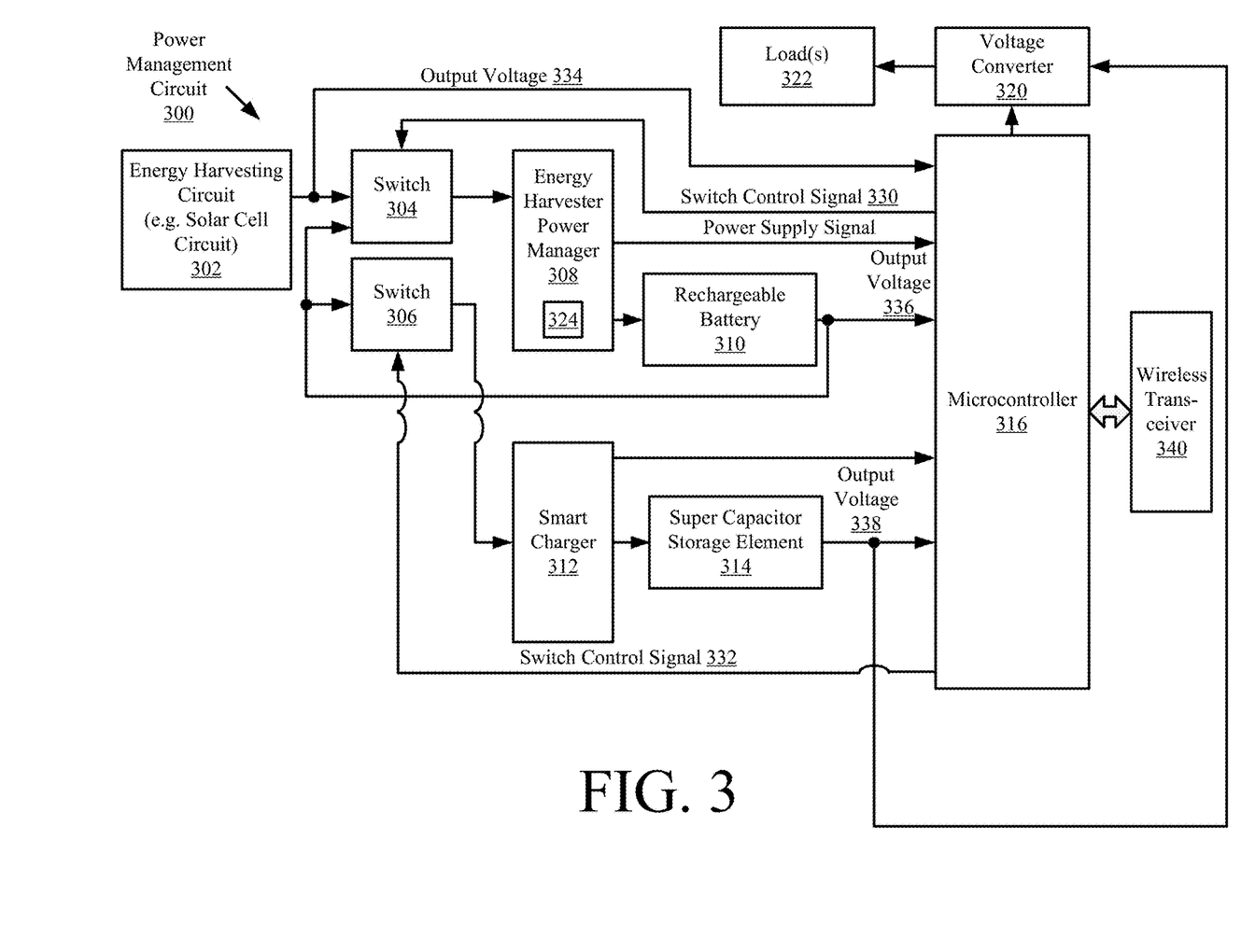
FIG. 3 is a block diagram of power management circuitry of the EHS system shown in FIGS. 1-2.

Referring now to FIG. 3, there is provided a block diagram of an exemplary architecture 300 for the PMC of the EHS system 100. The PMC is configured to provide a way in which the EHS system 100 is: deployable as a plug-n-play energy harvested wireless sensor that is ready to function as soon as it is turned on; and a self-sustaining sensor system wherein its power source would virtually never need to be replaced. In this regard, the PMC 300 comprises an energy harvesting circuit 302, switches 304, 306, an Energy Harvester Power Manager ("EHPM") 308, a rechargeable battery 310, a Super Capacitor ("SC") storage element 314, a smart charger 312 for the SC storage element, a microcontroller 316, a DC-DC voltage converter 320, load(s) 322 and a wireless transceiver 340. In some scenarios, the energy harvesting circuit 302 comprises a solar cell circuit. The present invention is not limited in this regard. Other types of energy harvesting circuits can be used herein that generate a relatively low amount of output power.

At initial power up of the EHS system 100, the SC storage element 314 is assumed to be in a completely discharged state. Thus, the initial charge of the SC storage element 314 is at a level of approximately or substantially equal to zero volts. However, the rechargeable battery 310 is in a quasi-discharged state in which its initial charge is at a level greater than zero volts (e.g., 3 volts). As such, the rechargeable battery 310 has a sufficient amount of initial stored energy to nearly instantaneously enable operations of the control electronics of the EHS system 100 (i.e., the EHPM 308 and the microcontroller 316). In this regard, an output voltage 336 is supplied from the rechargeable battery 310 to the EHPM 308 via switch 304, whereby operations of boost converters 324 contained in the EHPM 308 are started immediately after turning on the EHS system 100. The output voltage 336 is also supplied from the rechargeable battery 310 to the microcontroller 316 via the EHPM 308.

The available power from rechargeable battery is also used at this time to charge the SC storage element 314. In this regard, the output voltage 336 of the rechargeable battery 310 is supplied to the SC storage element 314 via switch 306 and smart charger 312, whereby charging of the SC storage element is expedited. An output voltage 338 of the SC storage element is supplied to the load(s) 322 via the voltage converter 320. The load(s) can include, but is(are) not limited to, smoke detectors, gas detectors and/or the like. The EHS system 100 is considered fully operational when the output voltage 338 reaches a level (e.g., 3.8 V) that is sufficient to cause the load(s) to perform the intended operations thereof.

Throughout operation of the EHS system 100, the microcontroller 316 monitors the output voltage 334 of the solar cell circuit 302, as well as the output voltage 336 of the rechargeable battery 310 and the output voltage 338 of the SC storage element 314. Once the output voltage 338 of the SC storage element 314 reaches a desired voltage (e.g., 3.8 V) after system activation (or powering on), the microcontroller 316 enables a timer to time the charging of the SC storage element 314. After a pre-determined time period (e.g., 6 hours), an assumption is made that the SC storage element 314 has reached its leakage current equilibrium, and therefore no longer needs to be charged. In effect, the microcontroller 316 may optionally perform operations at this time to terminate the supply of output voltage 336 to the SC storage element 314 via switch 306 and smart charger 312.

When the output voltage 338 of the SC storage element 314 falls below a threshold value (e.g., 3.3 V), the microcontroller 316 communicates a switch control signal 332 to switch 306 so as cause the output voltage 336 of the rechargeable battery 310 to once again be supplied to the SC storage element 314 via the smart charger 312. Output voltage 336 is supplied to the SC storage element 314 until the output voltage 338 thereof exceeds an upper threshold value. In effect, the SC storage element 314 is recharged whereby the energy expended while driving load(s) 322 is(are) restored.

When the solar cell circuit 302 is active, the output voltage 334 of the solar cell circuit 302 is supplied to the rechargeable battery 310 via EHPM 308. In effect, the rechargeable battery 310 is recharged by the solar cell circuit 302, whereby the energy expended in charging and re-charging the SC storage element 314 is restored while the EHS system 100 is maintained in its fully operational state.

The above described process of using the rechargeable battery 310 to charge the SC storage element 314 is repeated as needed. Thus, the above described EHS system 100 performs self-monitoring and charges its respective rechargeable elements throughout its entire operation.

In addition to the above process, the PMC 300 performs operations to autonomously managing power to the EHS system 100. The autonomous management is achieved by on-demand commanding and activating energy harvesting sources (e.g., florescent lights 106, 108 of FIG. 1) available with the EHS system's environment. The methods generally involve: sensing harvestable energy present within an EHS system's environment; assessing the sensed harvestable energy; automatically enabling an energy harvesting source based upon results of the assessment so that the energy harvesting source may be utilized by the EHS system to dynamically charge its rechargeable battery 310 and power its sensing system 322; and automatically disabling the energy harvesting source after the charging is complete to either conserve power and/or extend the operating life of the energy harvesting source. The energy harvesting source includes, but not limited to, an indoor light or an outdoor light. In the outdoor light scenarios, the outdoor light is enabled by opening window shades and disabled by closing window shades.

Figure 4:
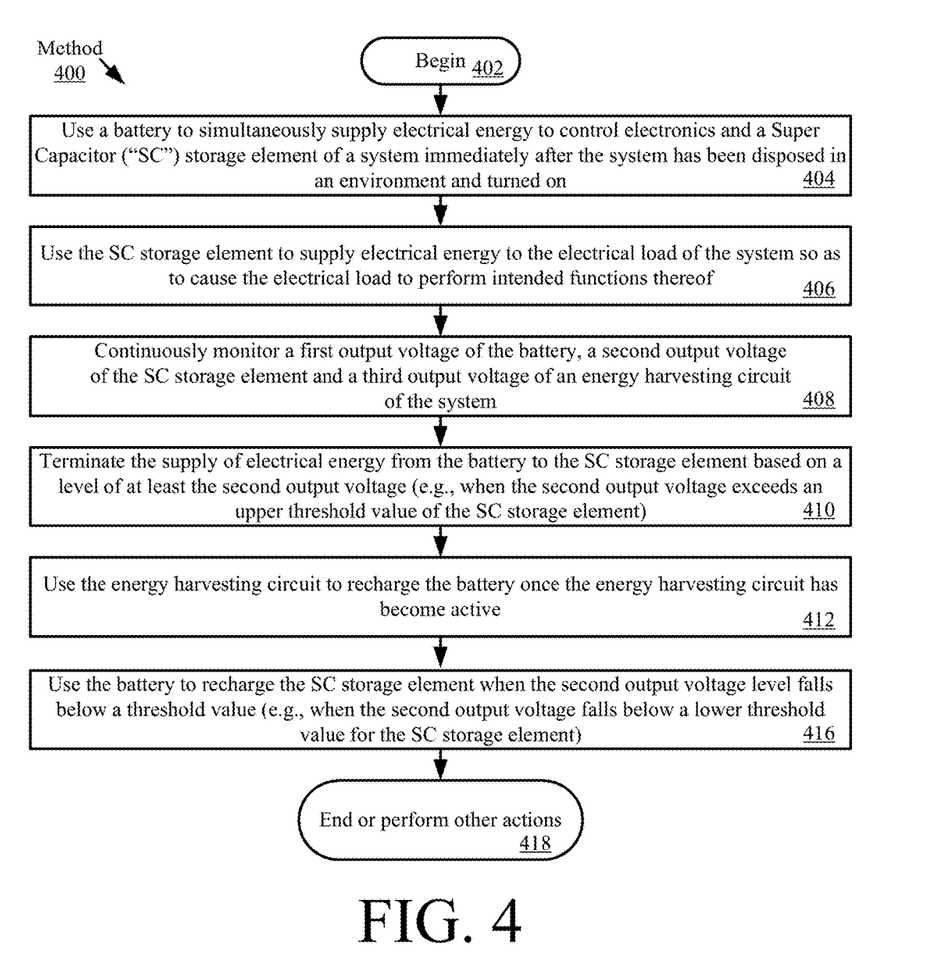
FIG. 4 is flow diagram of an exemplary method for powering an electrical load in an environment.

Referring now to FIG. 4, there is provided a flow diagram of an exemplary method 400 for powering an electrical load in an environment. The method 400 begins with step 402 and continues with step 404. In step 404, a battery (e.g., rechargeable battery 310) is used to simultaneously supply electrical energy to control electronics (e.g., control electronics 308, 316 of FIG. 3) and an SC storage element (e.g., SC storage element 314 of FIG. 3) of a system (e.g., system 100 of FIG. 1) immediately after the system has been disposed in the environment and activated (or turned on). In effect, the control electronics are caused to perform intended functions thereof nearly instantaneously after activating (or turning on) the system. The SC storage element is charged from a first charge state in which approximately zero volts exist across terminals thereof to a second charge state in which greater than zero volts exists across the terminals. The SC storage element is then used in step 406 to supply electrical energy to the electrical load (e.g., load 322 of FIG. 3) of the system so as to cause the electrical load to perform intended functions thereof.

Notably, the system continuously monitors a first output voltage of the battery, a second output voltage of the SC storage element and a third output voltage of an energy harvesting circuit of the system (e.g., energy harvesting circuit 302 of FIG. 3). The supply of electrical energy from the battery to the SC storage element is terminated in step 410 based on a level of at least the second output voltage. For example, in some scenarios, the battery's supply of electrical energy to the SC storage element is terminated when a determination is made that the SC storage element has reached a leakage current equilibrium or a determination that the output voltage of the SC storage element exceeds an upper threshold value thereof. The leakage current equilibrium is determined to be reached upon an expiration of a pre-defined time period (e.g., 6 hours) which was detected based on an output of a previously enabled timer.

The energy harvesting circuit is used in step 412 to recharge the battery once it becomes active. In a next step 416, the battery is used to recharge to SC storage element when the second output voltage falls below a first threshold value (e.g., when the output voltage of the SC storage element falls below a lower threshold value). Subsequent to completing step 416, step 418 is performed where method 400 ends or other actions are performed.

Figure 5A:
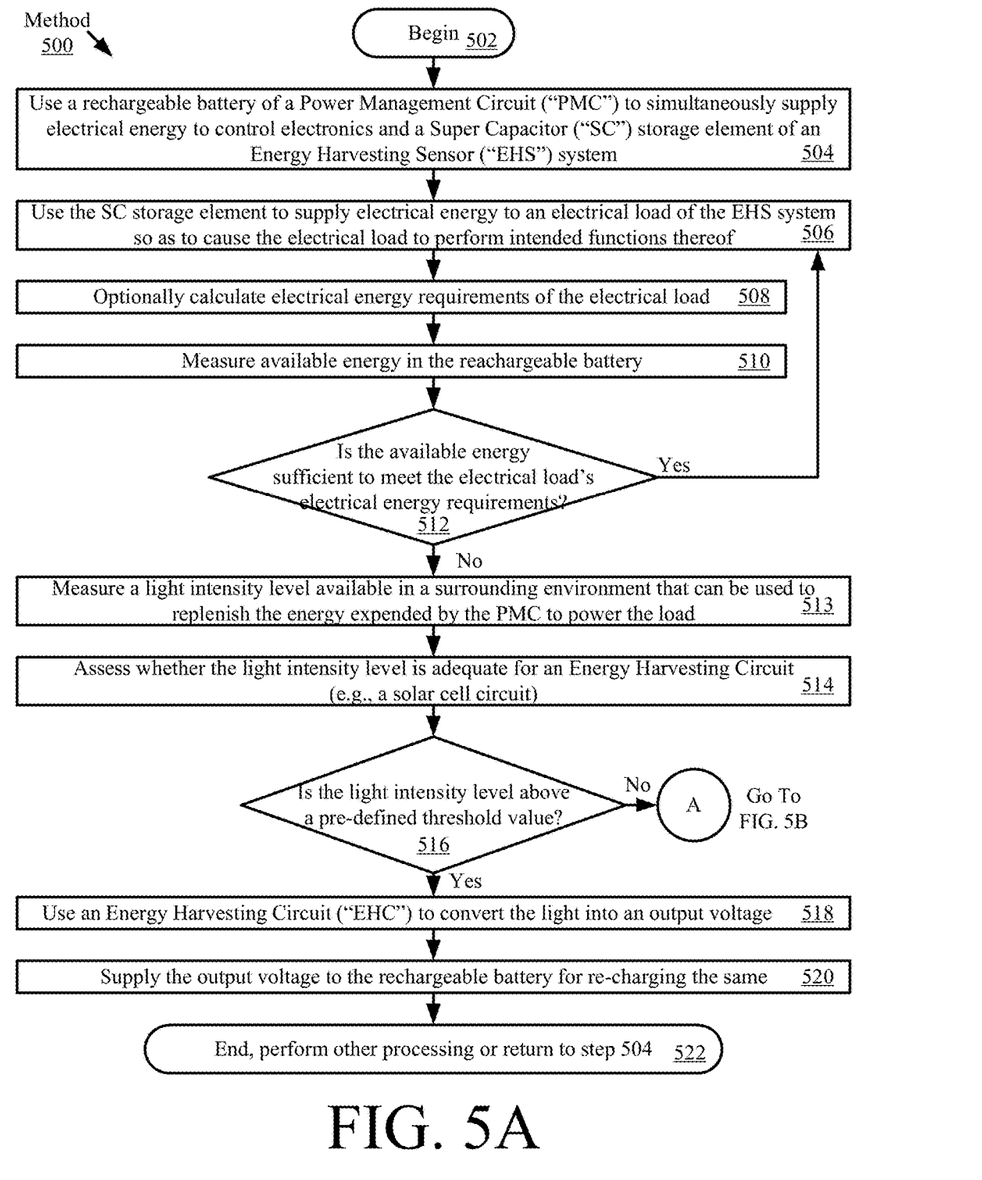
FIGS. 5A-5B (collectively referred to herein as "FIG. 5") provide a flow diagram of an exemplary method for adaptively managing power for a self-sustaining energy harvesting system.
Figure 5B:
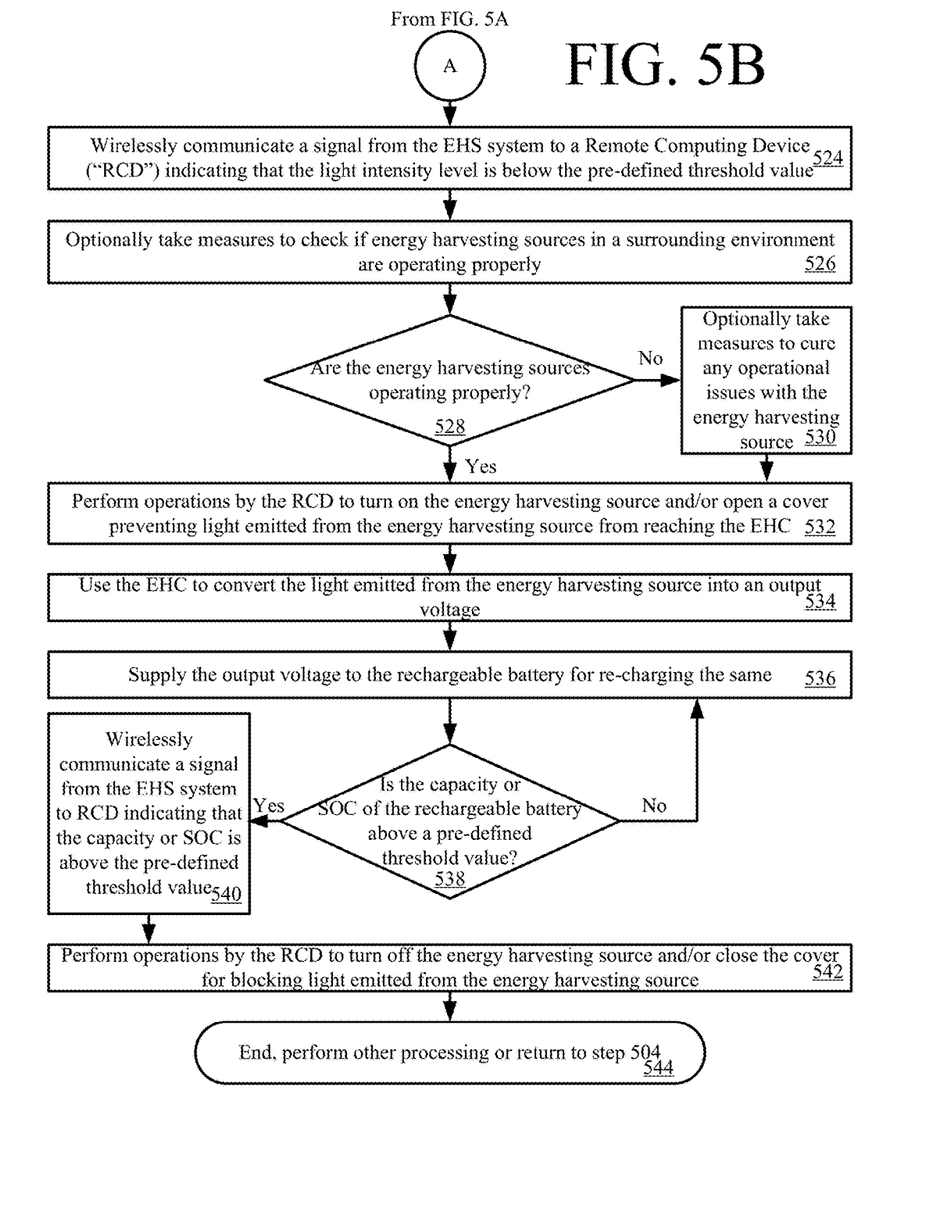

Referring now to FIGS. 5A-5B, there is provided a flow diagram of an exemplary method 500 for adaptively managing power for a self-sustaining EHS. The method 500 begins with step 502 and continues with step 504 where a rechargeable battery (e.g., rechargeable battery 310 of FIG. 3) of a PMC (e.g., PMC 300 of FIG. 3) is used to supply electrical energy to control electronics and an SC storage element (e.g., SC storage element 314 of FIG. 3) of an EHS system (e.g., EHS system 100 of FIG. 1). In a next step 506, the SC storage element is used to supply electrical energy to an electrical load (e.g., load 322 of FIG. 3) of the EHS system so as to cause the electrical load to perform unintended functions thereof.

Upon completing step 506, an optional step 508 may be performed. Optional step 508 involves calculating electrical energy requirements of the electrical load. In some scenarios, the electrical energy requirements are pre-calculated prior to deployment of the EHS system. In both cases, step 510 is performed where a measurement is made with regard to the available energy in the rechargeable battery. This measurement can involve measuring the capacity and/or SOC of the rechargeable battery. The term "State-Of-Charge" or "SOC", as used herein, refers to a percentage of charge (e.g., 0%-100%). The term "capacity", as used herein, refers to a measure (e.g., Amp-hr) of the charge stored by a power source (e.g., a battery), and is determined by the mass of the active material contained in the power source. The measured capacity and/or SOC may then be used to determine the duration of operation that can be afforded by the stored power.

Next, a determination is made as to whether the available energy is sufficient to meet the electrical load's electrical energy requirements. This determination can be made by comparing the capacity and/or SOC to a pre-defined threshold value. The pre-defined threshold value may be selected based on the measured electrical energy requirements of the electrical load. If the available energy is sufficient to meet the electrical load's electrical energy requirements [512: YES], then method 500 returns to step 506 so that the electrical load continues to be supplied power. In contrast, if the available energy is not sufficient to meet the electrical load's electrical energy requirements [512:NO], then method 500 continues with step 513.

Step 513 involves measuring a light intensity level available in a surrounding environment that can be used to replenish the energy expended by the PMC to power the load. Next, an assessment is made as to whether the light intensity level available is adequate for an EHC (e.g., EHC 302 of FIG. 3). If the light intensity level is above a pre-defined threshold value [516:YES], then steps 518-520 are performed. These steps involve: using the EHC to convert light into an output voltage; and supplying the output voltage to the rechargeable battery for re-charging the same. Next, step 522 is performed where method 500 ends, other processing is performed or method 500 returns to step 504.

Figure 7:
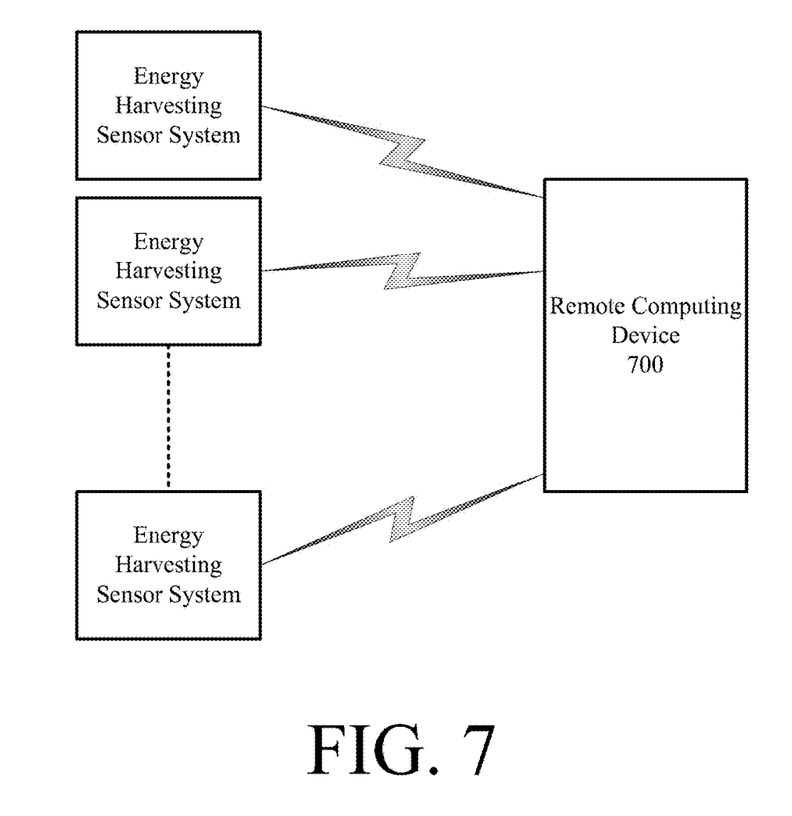
FIG. 7 is a schematic illustration of an exemplary system comprising a plurality of EHS systems wirelessly communicatively coupled to a remote computing device.

In contrast, if the light intensity level is below the pre-defined threshold value [516:NO], then method 500 continues with step 524 of FIG. 5B. Step 524 involves wirelessly communicating a signal from the EHS to a Remote Computing Device ("RCD") indicating that the light intensity level is inadequate for the EHC. The RCD (e.g., RCD 700 of FIG. 7) can include, but is not limited to, a server or other computing processing device. All of a portion of the RCD may be located in the same or different facility that the EHS system is disposed. The wireless communication can be achieved using any known or to be known wireless protocol. For example, the wireless communication is achieved using WiFi technology, Bluetooth technology, Zigbee technology, Z-Wave technology, cellular technology, custom sub-gig technology, and/or Ethernet technology.

In response to the wireless signal, measures can be optionally taken to check if energy harvesting sources in the surrounding environment are operating properly, as shown by step 526. For example, a determination can be made as to whether indoor lights are working properly, whether mechanical/electrical window shades are working properly, and/or whether power is being supplied to the lights and/or window shades. If the energy harvesting source(s) is(are) not operating properly [528:NO], then optional step 530 is performed where measures are taken to cure any operational issues with the energy harvesting source(s). For example, a person can be deployed to change a light bulb, fix a mechanical component of the mechanical/electrical window shades, turn on a generator so that power is supplied to the lights and/or window shades, and/or contact an electric company to inform them of a loss of power. Next, step 532 is performed which will be described below.

If the energy harvesting source(s) is(are) operating properly [528:YES], then step 532 is performed where the RCD performs operations to turn on the energy harvesting source(s) and/or open a cover (e.g., a window shade) preventing light emitted from the energy harvesting source(s) from reaching the EHC. The EHC is then used in step 534 to convert the light emitted from the energy harvesting source(s) into an output voltage. The output voltage is then supplied to the rechargeable battery for re-charging the same, as shown by step 536. Next, a determination is made as to whether the capacity or SOC of the rechargeable battery has reached a certain level.

If the capacity or SOC of the rechargeable battery is not above a pre-defined threshold value [538:NO], then method 500 returns to step 536 so that the output voltage of the EHC continues to be supplied to the rechargeable battery. If the capacity or SOC of the rechargeable battery is above a pre-defined threshold value [538:YES], then method 500 continues with steps 540-542. These steps involve: wirelessly communicating a signal from the EHS system to the RCD indicating that the capacity or SOC of the rechargeable battery is above the pre-defined threshold value; and performing operations by the RCD to turn off the energy harvesting source and/or close the cover for blocking light emitted from the energy harvesting source. Subsequently, step 544 is performed where method 500 ends, other processing is performed, or method 500 returns to step 504.

Figure 6A:
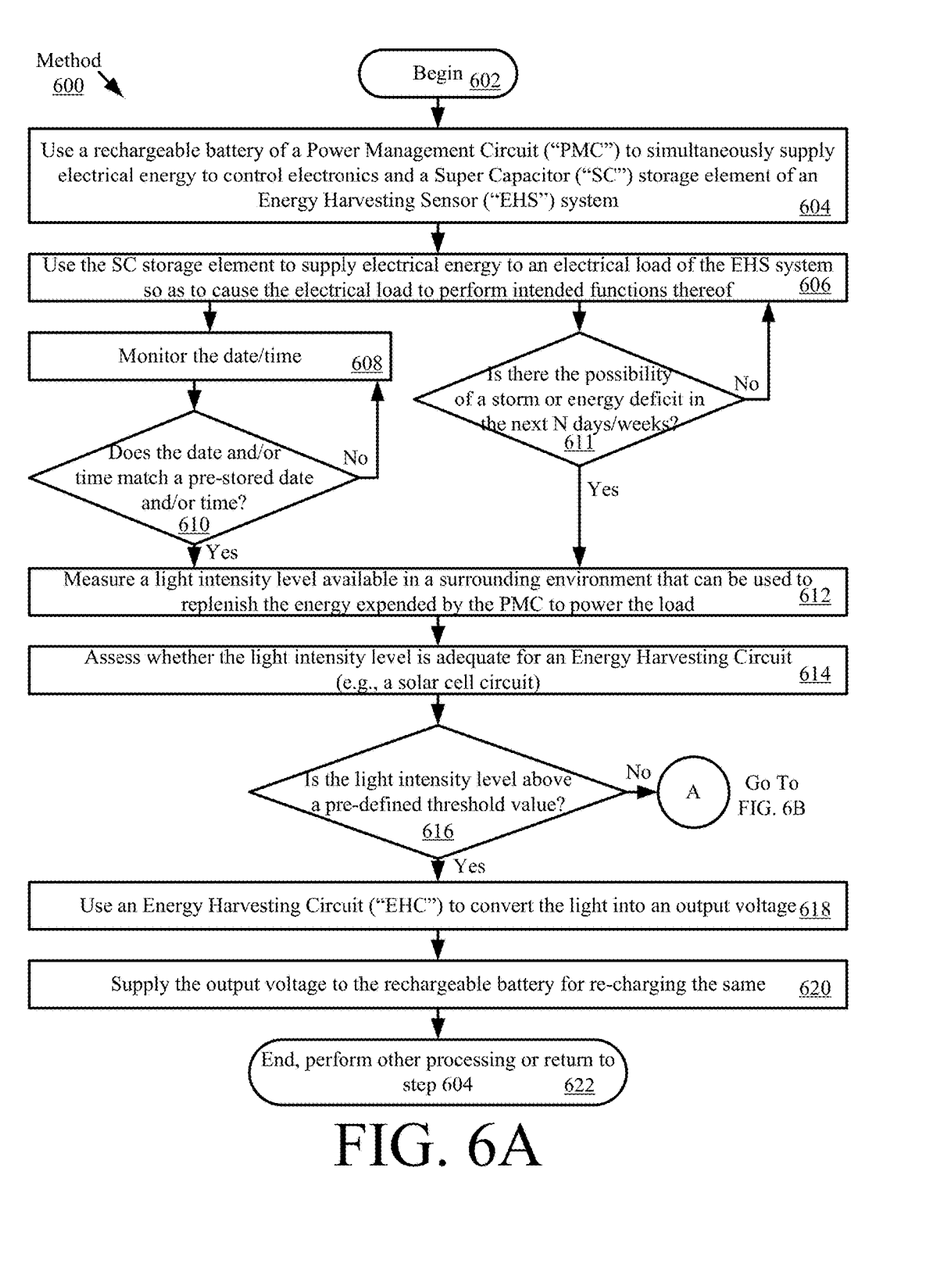
FIGS. 6A-6B (collectively referred to herein as "FIG. 6") provide a flow diagram of an exemplary method for adaptively managing power for a self-sustaining energy harvesting system.
Figure 6B:
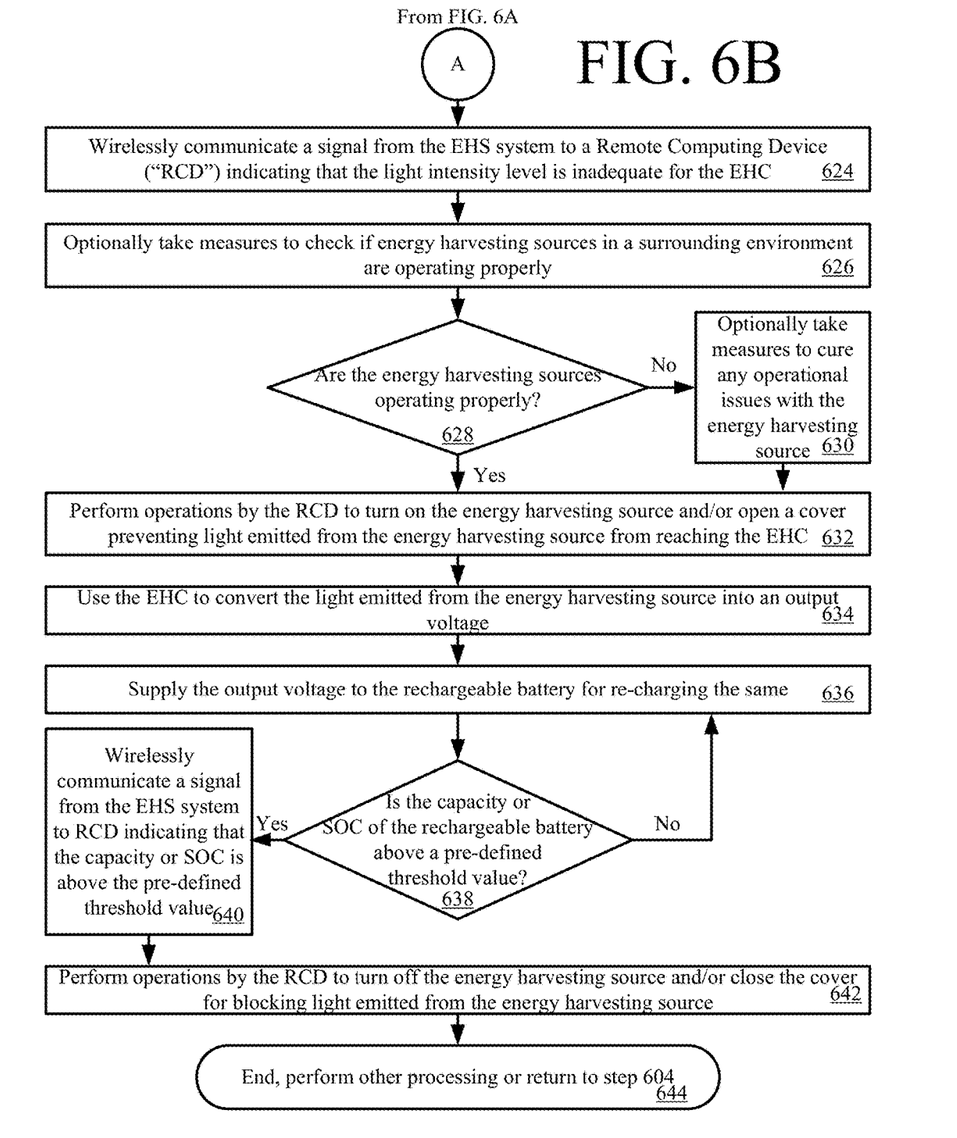

Referring now to FIGS. 6A-6B, there is provided a flow diagram of an exemplary method 600 for adaptively managing power for a self-sustaining EHS. The method 600 begins with step 602 and continues with step 604 where a rechargeable battery (e.g., rechargeable battery 310 of FIG. 3) of a PMC (e.g., PMC 300 of FIG. 3) is used to supply electrical energy to control electronics and an SC storage element (e.g., SC storage element 314 of FIG. 3) of an EHS system (e.g., EHS system 100 of FIG. 1). In a next step 606, the SC storage element is used to supply electrical energy to an electrical load (e.g., load 322 of FIG. 3) of the EHS system so as to cause the electrical load to perform unintended functions thereof.

Upon completing step 606, method 600 continues with steps 608-610 or step 611. Steps 608-610 involve: monitoring a date and/or time; and determining if the date and/or time match(es) a pre-stored date and/or time. The pre-stored date and/or time can be selected based on: power consumption patterns of the EHS system; power profiles of energy harvesting sources; estimated future energy deficits of the EHS system and/or energy harvesting source(s) energy; a business entity's hours of operation; current and future weather of a surrounding environment; and/or time of low power demands on an AC power grid (e.g., 2 AM at which an electric company charges a reduced fee). Upon completing step 610, method 600 continues with step 612.

Step 611 involves determining whether there is a possibility of a storm or energy deficit in the next N days or weeks, where N is an integer. If there is not a possibility of a storm or energy deficit in the given time period [611:NO], then method 600 returns to step 606. In contrast, if there is a possibility of a storm or energy deficit in the given time period [611:YES], then step 612 is performed.

Step 612 involves measuring a light intensity available in a surrounding environment that can be used to replenish the energy expended by the PMC to power the load. Next in step 614, an assessment is made as to whether the light intensity level is adequate for an EHC (e.g., EHC 302 of FIG. 3). If the light intensity level is above a pre-defined threshold value [616:YES], steps 618-620 are performed. These steps involve: using the EHC to convert the light into an output voltage; and supplying the output voltage to the rechargeable battery for re-charging the same. Next, step 622 is performed where method 600 ends, other processing is performed, or method 600 returns to step 604.

In contrast, if the light intensity level is not above a pre-defined threshold value [616:NO], then method 600 continues with step 624 of FIG. 6B. Step 624 involves wirelessly communicating a signal from the EHS system to an RCD (e.g., RCD 700 of FIG. 7) indicating that the light intensity level is inadequate for the EHC. Upon completing step 624, optional step 626 may be performed where measures are taken to check if energy harvesting sources in a surrounding environment are operating properly. If the energy harvesting sources are operating properly [628:YES], then step 632 is performed which will be described below. In contrast, if the energy harvesting sources are not operating properly [628:NO], then optional step 630 may be performed. Optional step 630 involves taking measures to cure any operational issues with the energy harvesting source(s). Upon completing optional step 630, step 632 is performed.

In step 632, operations are performed by the RCD to turn on the energy harvesting source(s) and/or open a cover preventing light emitted from the energy harvesting source(s) from reaching the EHC. Next in step 634, the EHC is used to convert the light emitted from the energy harvesting source into an output voltage. The output voltage is supplied to the rechargeable battery for re-charging the same, as shown by step 636.

If the capacity or SOC of the rechargeable battery is not above a pre-defined threshold value [638:NO], method 600 returns to step 636. In contrast, if the capacity or SOC of the rechargeable battery is above the pre-defined threshold value [638:YES], steps 640-642 are performed. These steps involve: wirelessly communicating a signal from the EHS system to the RCD indicating that the capacity or SOC is above the pre-defined threshold value; and performing operations by the RCD to turn off the energy harvesting source(s) and/or close the cover for blocking light emitted from the energy harvesting source(s). Subsequently, step 644 is performed where method 600 ends, other processing is performed, or method 600 returns to step 604.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:
1. A method for adaptively managing power for an Energy Harvesting System ("EHS"), comprising:
   using electricity generated by an Energy Harvesting Circuit ("EHC") from ambient light energy of an indoor surrounding environment to charge a rechargeable battery of the EHS;
   using power from the rechargeable battery to charge an another energy store of the EHS;

detecting, by a microcontroller the EHS, when an output voltage of the another energy store has reached a given voltage value;

starting a timer by the microcontroller in response to a detection that the output voltage of the another energy store has reached a given voltage value;

detecting when a given period of time starting from a start time of the time has expired;

breaking an electrical connection between the rechargeable battery and the another energy store so that a supply of power from the rechargeable battery to the another energy store is discontinued, upon detecting expiration of the given period of time; and supplying a voltage to a load of the EHS from the another energy store rather than from the rechargeable battery.

2. The method according to claim 1, further comprising wirelessly communicating a first wireless signal from the EHS to cause a remote device to perform first operations to increase a level of light intensity for the indoor surrounding environment through remote lighting control or through remote window treatment control.

3. The method according to claim 2, further comprising wirelessly communicating a second wireless signal from the EHS to cause the remote device to perform second operations to decrease the level of light intensity for the indoor surrounding environment through remote lighting control or through remote window treatment control, when a capacity or State-Of-Charge ("SOC") of the reachargeable battery reaches a pre-specified value or a pre-specified period of time has expired since the start time at which the electricity generated by the EHS was used to charge the reachargeable battery.

4. The method according to claim 1, further comprising using power from the rechargeable battery to recharge the another energy store of the EHS when a detection is made that the another energy store's output voltage falls below a threshold value.

5. The method according to claim 1, further comprising using the electricity generated by the EHC to restore any energy expended by the reachargeable battery in charging and re-charging the another energy store, while the EHS is maintained in a fully operational state.

6. The method according to claim 1, wherein the given period of time is selected to comprise an amount of time the another energy store takes to reach a leakage current equilibrium or have an output voltage exceeding a threshold value.

7. The method according to claim 1, further comprising using the rechargeable battery to simultaneously supply electrical energy to control electronics and the another energy store of the EHS immediately after the EHS has been disposed in the indoor surrounding environment and activated.

8. An Energy Harvesting System ("EHS"), comprising:
an energy store;
a rechargeable battery configured to supply power to the energy store;
an Energy Harvesting Circuit ("EHC") configured to generate electricity from ambient light energy of an indoor surrounding environment, where the electricity is used to charge the rechargeable battery; and
a microcontroller configured to
detect when an output voltage of the energy store has reached a given voltage value when being charged by the power supplied from the rechargeable battery,
start a timer in response to a detection that the output voltage of the energy store has reached the given voltage value,
detect when a given period of time starting from a start time of the time has expired, and
cause a break in an electrical connection between the rechargeable battery and the energy store so that the supply of power from the rechargeable battery to the energy store is discontinued, upon detecting expiration of the given period of time; and
wherein a voltage is supplied to a load of the EHS from the energy store rather than from the rechargeable battery.

9. The EHS according to claim 8, wherein the EHS is further configured to wirelessly communicate a first wireless signal to cause a remote device to perform first operations to increase a level of light intensity for the indoor surrounding environment through remote lighting control or through remote window treatment control.

10. The EHS according to claim 9, wherein the EHS is further configured to wirelessly communicate a second wireless signal to cause the remote device to perform second operations to decrease the level of light intensity for the indoor surrounding environment through remote lighting control or through remote window treatment control, when a capacity or State-Of-Charge ("SOC") of the reachargeable battery reaches a pre-specified value or a pre-specified period of time has expired since the start time at which the electricity generated by the EHS was used to charge the reachargeable battery.

11. The EHS according to claim 8, wherein power from the rechargeable battery is used to recharge the energy store when a detection is made that the energy store's output voltage falls below a threshold value.

12. The EHS according to claim 8, wherein the electricity generated by the EHC is used to restore any energy expended by the reachargeable battery in charging and re-charging the energy store, while the EHS is maintained in a fully operational state.

13. The EHS according to claim 8, wherein the given period of time is selected to comprise an amount of time the another energy store takes to reach a leakage current equilibrium or have an output voltage exceeding a threshold value.

14. The EHS according to claim 8, wherein the rechargeable battery is used to simultaneously supply electrical energy to control electronics and the energy store of the EHS immediately after the EHS has been disposed in the indoor surrounding environment and activated.

* * * * *